July 5, 1932.  E. C. AKERS  1,865,809
SWITCH DEVICE FOR DIRECTION SIGNAL SYSTEMS
Filed April 30, 1928  3 Sheets-Sheet 1
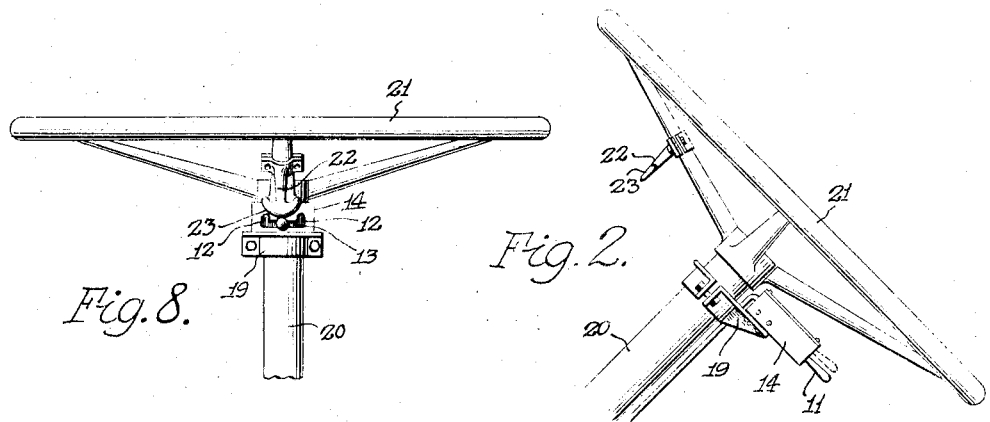
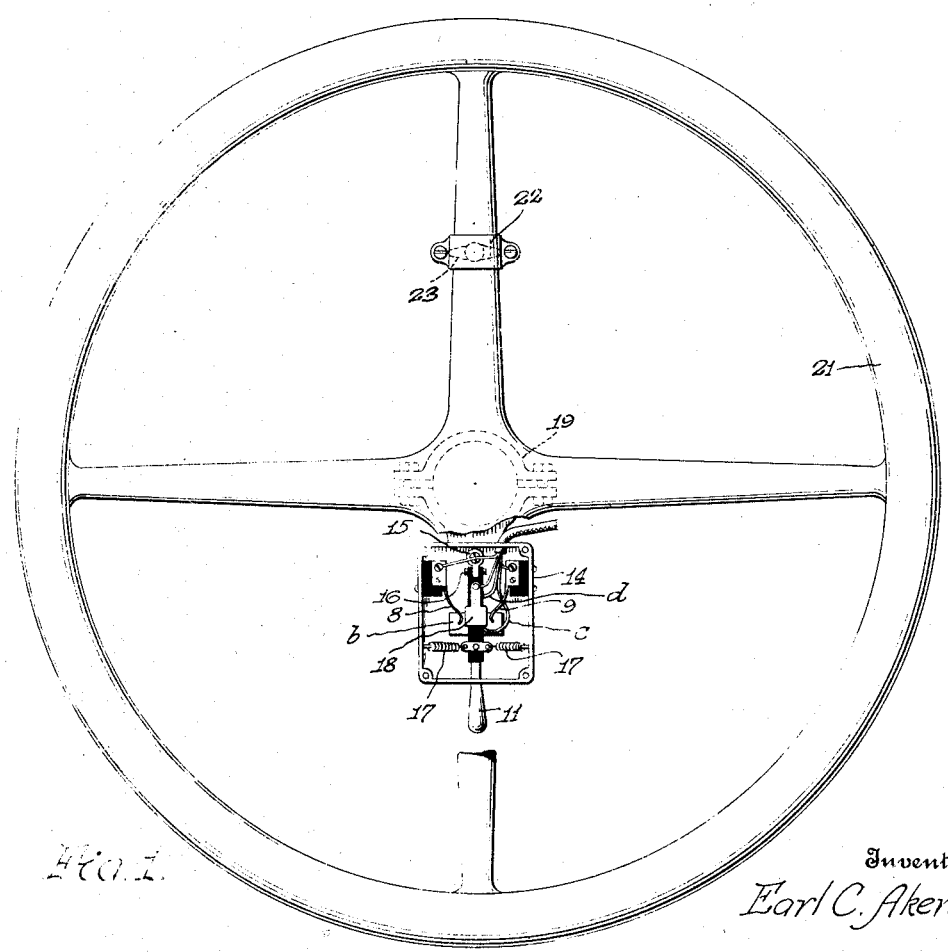
Inventor
Earl C. Akers, July 5, 1932.                E. C. AKERS                1,865,809
SWITCH DEVICE FOR DIRECTION SIGNAL SYSTEMS
Filed April 30, 1928    3 Sheets-Sheet 2

Inventor
Earl C. Akers,

By
Attorneys

Patented July 5, 1932

1,865,809

UNITED STATES PATENT OFFICE

EARL C. AKERS, OF DETROIT, MICHIGAN

SWITCH DEVICE FOR DIRECTION-SIGNAL SYSTEMS

Application filed April 30, 1928. Serial No. 273,871.

This invention relates to a switch device for direction signal systems for motor vehicles and more particularly to devices of that character adapted to be set by the operator to indicate the direction of intended travel and are so arranged that upon making the turn, the control switch of the indicating device will be automatically released and returned to neutral position or the position in which it is normally inoperative when the vehicle is proceeding in a forward direction. An object of the present invention, is to provide an arrangement whereby a flashing of the signal lights may be effected to give a warning signal that a change in direction of travel is about to be made, and further to provide a switch construction which is cheap to manufacture, efficient in operation and may be quickly installed upon any of the several automobile constructions, to be operated for releasing the same, by the operation of steering the vehicle to the right or left.

With the above and other ends in view, the invention consists in the matters hereinafter set forth and more particularly pointed out in the appended claims, reference being had to the accompanying drawings, in which Figure 1 is a plan view of a steering wheel with a switch device embodying the present invention in operative position relative thereto, portions of the steering wheel being broken away to show the switch device which is shown with the cover thereof removed to disclose the internal mechanism;

Fig. 2 is a side elevation of the construction shown in Fig. 1;

Fig. 8 is an elevation of the steering wheel with the switch device in operative position relative thereto, looking at the front or operating handle side of the view shown in Fig. 2;

Those signal devices which are in common use for indicating the direction of travel of a motor vehicle are commonly operated either manually by the pressing of a button, or operation of some other device for making the necessary electrical connection to indicate the direction of turning movement, which button or device automatically returns to normal position when released, or such electrical connection is made automatically by the operation of the steering mechanism in directing the vehicle to the right or left. But in the former instance it is necessary for the operator to manually hold the button or other device as long as he wishes the signal to be displayed, and in the latter construction the signal is not given until the turning movement of the vehicle has started and therefore no previous warning is given as to the intended change in direction of travel.

The present invention contemplates an arrangement of switch device whereby the driver of the vehicle may give a warning signal or may set his signal to indicate a right or left turn prior to making such a turn and as long in advance thereof as he deems advisable or necessary, and then when the turn is made, the signal is automatically released or returned to neutral position for direct forward movement of the vehicle. Warning may therefore be given the following vehicle and the intentions of the driver indicated in advance so that the driver of the following vehicle may govern his movements accordingly. To guard against the contingency of the driver forgetting to operate his signal after he has made the turn, the device is automatically returned to neutral by the steering of the vehicle to the right or left, as indicated by the signal which he has set.

Figure 3:
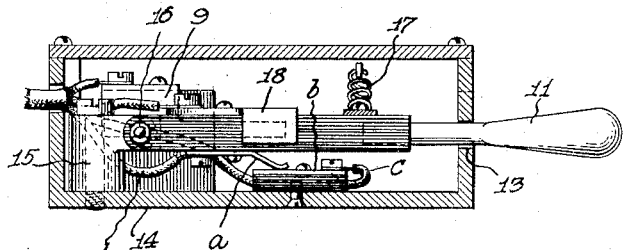
Fig. 3 is a detail of the switch device, showing the same in longitudinal vertical section.
Figure 4:
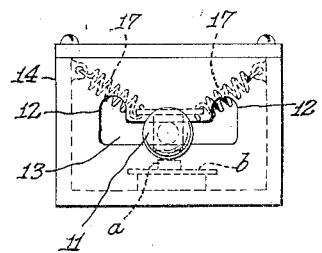
Fig. 4 is a front end elevation of Fig. 3.
Figure 5:
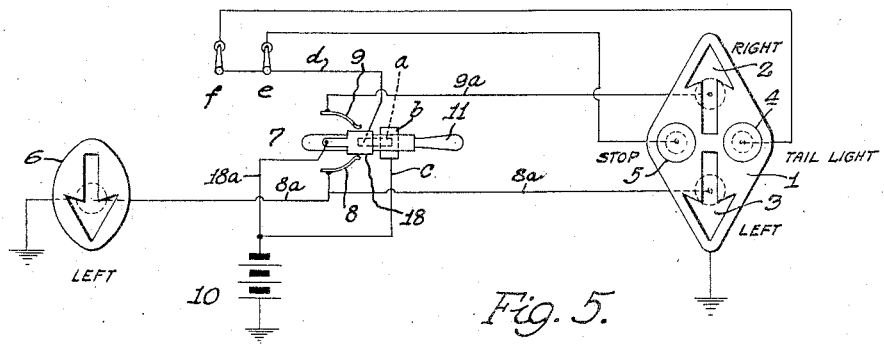
Fig. 5 is a diagrammatic view of a signal system embodying the present invention.

A direction-signal system in which is connected a switch device illustrative of an embodiment of the present invention is shown in Figure 5 of the drawings, and this system includes the usual direction indicating devices. A rear direction signal device of any suitable construction is indicated at 1, said device including a suitable casing containing lamps and having direction indicating devices, such as arrows 2 and 3 which are displayed by the lighting of the lamps within the casing. This signal device also includes the usual tail light 4 and the stop light 5, the arrow 2 pointing to the right and indicating a right turn and the arrow 3 pointing to the left and indicating a left turn when the lamps for lighting these arrows are lit. As indicated in Fig. 5 a direction signal device 6 may also be employed at the front end of the car. A switch device, indicated as a whole by the numeral 7, is connected within the electrical circuit for the several lamps and this switch device is operative between contact members 8 and 9 connected in the circuit leading from the battery 10 and connected also to the switch in such a manner that when the switch arm is moved to the right, contact is made with the arm 9 and current will flow to the light below the arrow 2 but when the switch arm is moved to the left it will engage the contact 8 and close the circuit to the light within the arrow 3, thus indicating a left turn.

By manipulating the handle 11 of the switch 7, the driver of the car may make electrical connection with the first right and then left indicator to flash the right and left lights and thus give a warning signal that a change in direction is about to be made. He may then throw the handle to the right or left according to the direction in which he is intending to turn and this handle will be held in the position to which it is thrown by engaging notches 12 at the end of the slot 13 through which the handle extends in the end of the switch casing 14.

The handle 11 extends into the casing to the opposite end thereof where it is pivotally supported at 15 for swinging movement laterally and it is also provided with a transverse pivot 16 so that it may swing in an up and down direction and enter the notches 12 at the ends of the slot 13 where it will be held by means of springs 17. These springs act equally upon the handle or lever and thus ordinarily hold the lever in mid position where a contact member 18 carried by the lever and insulated therefrom will be out of contact with both of the spring arms 8 and 9.

The circuit wire 18$^a$ leads from the battery 10 to the contact 18 and wires 8$^a$ and 9$^a$ are connected to the arms 8 and 9 and lead to the lamps for the arrows 3 and 2 respectively. Therefore, when the arm is in mid position the circuits of these lamps are broken and the direction-signal lights are extinguished. The lever 11 is therefore normally held in mid position by the springs 17 with the lights extinguished, so that in driving forwardly, there will be no indication of a turn either to the right or left, but when the driver wishes to make a right or left turn, or is contemplating doing so, he may throw the handle 11 toward the right or left, according to the direction in which he is intending to turn and this will light the right or left hand signal, the handle engaging one of the notches 12 and holding the handle in that position until released from the notch, when it will again assume mid position. If he wishes to give a warning or attract the attention of the driver of another car, he may swing the handle from right to left and back again a number of times, alternately closing and opening the circuits of the indicating lamps, causing them to flash, the stop and tail lights remaining lit due to the fact that said lever 11 is provided with a contact arm $a$ on its lower side which slides in contact with a contact plate $b$ insulated from the bottom of the casing and from which plate a wire $c$ leads to the battery, a wire $d$ being connected to the arm $a$ and leading to switches $e$ and $f$ which control the circuits of the lamps 4 and 5. However when the lever 11 rises in one of the notches 12, the arm $a$ leaves the plate $b$ and the stop and tail lights are extinguished so that there will be no confusion when the signal is set, as the lamp indicating the right or left turn will be the only one lit when the switch is so set.

In order to release the handle 11 from its holding notch 12 automatically so that the signal light will be extinguished after the turn is made without any attention on the part of the operator, the switch box 14 is supported upon a bracket 19 secured to the fixed or hollow pedestal 20 through which the steering shaft, upon which the steering wheel 21 is mounted, extends. The arms of the steering wheel are therefore directly above and close to the switch box and secured in any suitable manner to one of these arms of the steering wheel is an arm 22 projecting downwardly from the wheel so that when the handle 11 is thrown up into one of the notches 12, said handle will extend within the plane of movement of this arm 22 as it is carried around by the turning of the wheel 21 in directing the vehicle. The lower end of the arm 22 is preferably rounded or of cam shape, as at 23, so that it will readily ride over and depress the handle 11 as it is brought into engagement therewith by the turning of the steering wheel in either direction.

After setting the switch to indicate the direction in which the operator intends to drive his machine, it is therefore unnecessary for him to return the switch lever to mid position, thus obviating the danger of forgetting to reset the switch, and when he turns the steering wheel to direct the machine in the indicated direction, the arm 22 is brought thereby into engagement with the switch lever, which is thus released from its notch 12 and immediately is returned to mid position by the spring 17.

Figure 6:
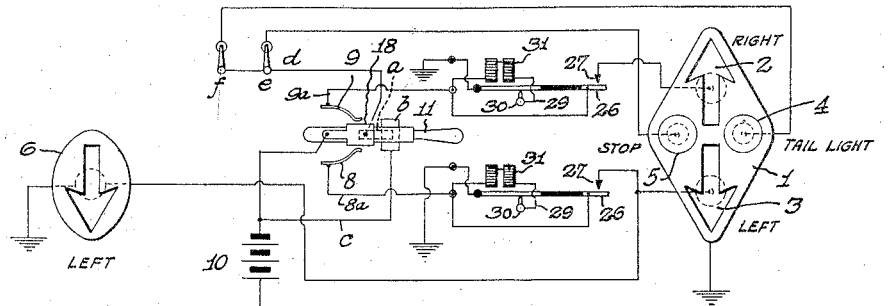
Fig. 6 is a similar diagrammatic view showing a modified construction wherein automatic flashing devices are embodied in the system.
Figure 7:
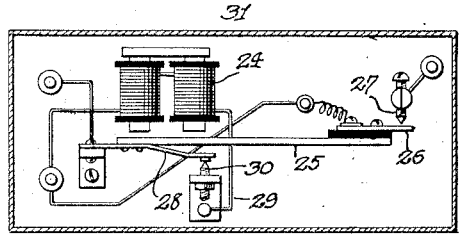
Fig. 7 is a sectional detail of an automatic electrical flasher suitable for use in connection with the signal system.

As previously pointed out, the operator may give a warning signal of his intention to make a turn, by moving the lever first to the right and then to the left, thereby flashing the signal lights alternately but to obviate the necessity for manually shifting the switch lever for this purpose, suitable flashers may be installed in the electrical circuit of the rear signal device and which flashers are automatically operated to make and break the circuit. This device includes a pair of electro-magnets 24 connected to the electrical circuit together with an armature 25 which is pivotally supported at one end and carries at its opposite end a contact 26 also connected in the circuit. A terminal 27 connected in the circuit is opposed to the contact 26 and a spring arm 28 on the armature 25 is adapted to make electrical connection in the circuit 29 of the electro-magnets 24 by contacting with a terminal member 30. Energizing of the electro-magnets draws the armature toward them and closes the circuit at 27 to light the signal lights. The armature 25 in moving toward the electro-magnets opens the circuit of the magnets at 30 just after contact is made at 27 and thus the magnets are de-energized directly after the light circuit is closed so that the armature will then fall away from the contact 27 and break the light circuit. In so falling it brings the arm 28 into engagement with the contact 30 and current is again passed through the magnets, thus repeating the operation and flashing the signal lights automatically. Such flashers which are indicated as a whole by the numeral 31, may be connected in the electrical circuit of each of the right and left signal lamps, as indicated in Figure 6.

Figure 9:
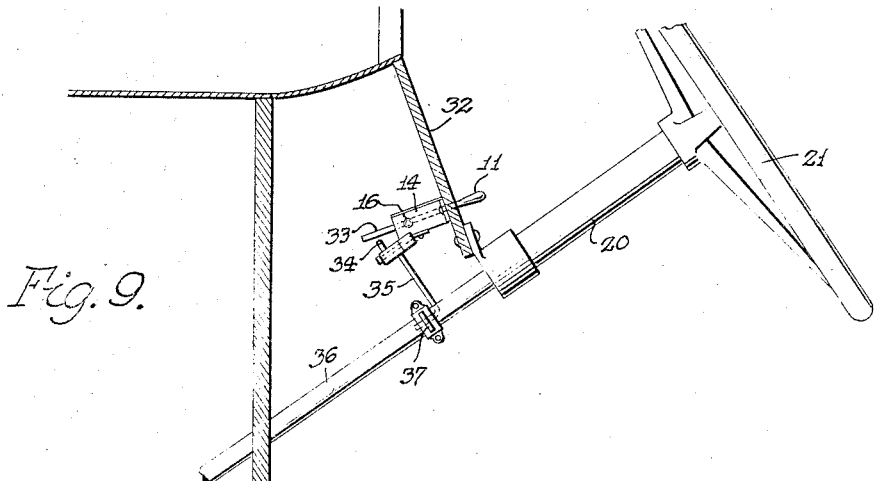
Fig. 9 is a view illustrative of a modified construction in which the switch device is shown in a different position and is operated by means applied to the steering shaft.
Figure 10:
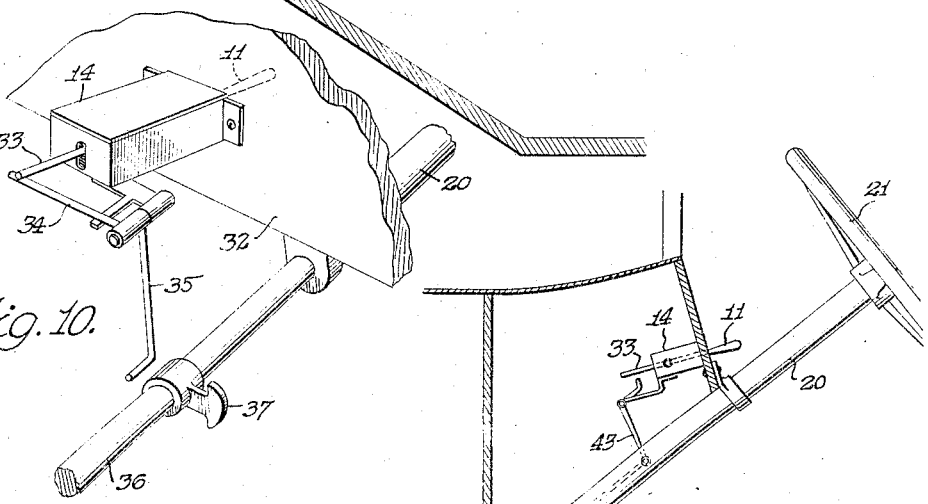
Fig. 10 is a perspective view of the construction shown in Fig. 9.
Figure 11:
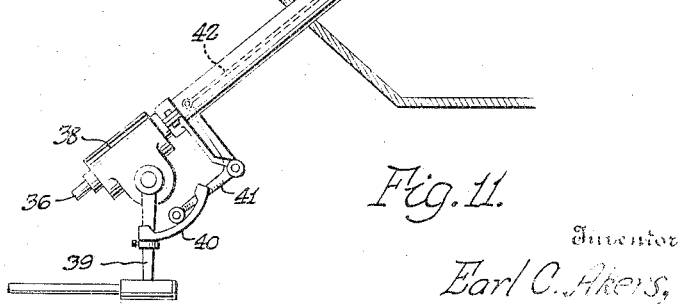
Fig. 11 is a further modified construction showing means for operating the switch device, which means is applied to the steering arm of the steering mechanism.

It may be found desirable to mount the switch box 14 on the instrument board 32, as indicated in Figs. 9 and 10, instead of mounting this box in an exposed position directly beneath the steering wheel, as shown in Figs. 1 and 2. In order to release the handle 11 from its notch 12 into which it has been moved to set the signal, where the switch box is located on the switch board, the switch handle or lever is extended, as at 33, through the rear end of the box and this extended end is engaged by the arm 34 of a bell crank pivotally supported in any convenient manner adjacent the end of the box. The other arm 35 of the bell crank extends downwardly toward the steering shaft 36 upon the upper end of which the steering wheel 21 is mounted, and secured to this shaft 36 is a cam member or projecting arm 37 which rotates with the shaft as the shaft is turned by the steering wheel in directing the vehicle, and the lower bent end of the bell crank arm 35 lies within the path of movement of this cam projection 37 so that, after the switch arm is set, the turning of the steering shaft will cause the release of the switch arm through the operation of the cam projection 37 being brought into contact with the arm 35 of the bell crank which will turn this bell crank and cause its arm 34 to lift the projecting end 33 of the switch lever, rocking this lever upon its pivot 16 and disengaging the handle end thereof from the notch 12 with which it has been engaged.

In those constructions of steering mechanism where the fixed steering post or casing 20 extends the full length of the steering shaft 36 with its lower end made fast to the worm gear casing 38 through which the shaft extends, the switch may then be operated when positioned on the instrument board by providing the steering arm 39 which is operated through the turning of the shaft 36 by means of gearing (not shown) located in the casing 38. In order that the lever 11 may be released when the vehicle steering wheels are turned to direct the car to the right or left, a cam arm 40 is secured to the steering arm 39 and this arm 40 operates a bell crank 41 mounted in any suitable manner on the steering column 20, and this bell crank is connected by a rod 42 to a second bell crank 43 mounted adjacent the switch casing 14 to one arm of the bell crank in a position to engage the projecting end 33 of the switch arm. Turning of the steering wheel and thus swinging the steering arm will thus operate to release the switch arm and extinguish the signal lights.

Obviously other methods may be devised for connecting up a control switch so that it will be automatically released by the steering of the vehicle to the right or left, and changes may also be made in the construction and arrangement of the switch itself without departing from the spirit of the invention. I do not, therefore, limit myself to the particular construction or arrangement shown.

Having thus fully described my invention, what I claim is:—

1. In a direction signal system for motor vehicles, means for controlling the operation of a signal device of said system including switch mechanism connected in an electric circuit for said device and comprising a casing having a slot in one end thereof formed with upward end extensions, a switch lever pivoted at one end within said casing for horizontal swinging movement along said slot and for limited lateral movement, said lever projecting through said slot, spring contact members at opposite sides of said lever within said casing and in spaced relation to said lever when the same is in mid position, a contact member carried by the underside of said lever, a contact member on the casing opposite said mid position of said lever to make contact when said lever is in mid position and close a circuit of a tail lamp of said system, springs for moving said lever to intermediate position to break the circuit of said signal system and light said tail lamp and to move said lever into said slot extensions at each end of its stroke, and means above said casing and operated by the steering of a vehicle upon which said system is installed for depressing said lever against the action of said springs when said lever is engaged within either of said slot extensions to release said lever and permit it to be moved to neutral position by said springs.

2. In a direction signal system for motor vehicles, a switch device for controlling an electric circuit of said signal system, said switch device including a casing and an operating lever adapted to be manually operated to close said circuit, said lever being pivotally mounted at its inner end to swing across said casing at its outer end, said casing having means to engage and detachably hold said lever at each end of its movement, said lever having a transverse pivot to permit upward movement of said lever at each end of its swinging movement to bring the same into engagement with said holding means, opposed springs for yieldingly holding said lever in mid-position with the circuit broken, and means rotatable above said casing for engaging the projecting end of said lever and releasing the same from engagement with said holding means at either end of its movement.

In testimony whereof I affix my signature.

EARL C. AKERS.